United States Patent
Gierling et al.

(10) Patent No.: US 8,197,388 B2
(45) Date of Patent: Jun. 12, 2012

(54) METHOD FOR AUTOMATICALLY ENGAGING A PARKING LOCK OF AN AUTOMATIC OR AUTOMATED GEARBOX OF A MOTOR VEHICLE

(75) Inventors: Armin Gierling, Langenargen (DE); Walter Hecht, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/198,818

(22) Filed: Aug. 5, 2011

(65) Prior Publication Data
US 2011/0306465 A1    Dec. 15, 2011

Related U.S. Application Data

(62) Division of application No. 12/186,713, filed on Aug. 6, 2008, now Pat. No. 8,062,180.

(30) Foreign Application Priority Data

Sep. 5, 2007  (DE) .................. 10 2007 042 210

(51) Int. Cl.
B60W 10/04   (2006.01)
F16H 61/16   (2006.01)
(52) U.S. Cl. ........................... 477/115; 477/125
(58) Field of Classification Search .................. 477/114, 477/115, 125; 74/335, 473.21; 701/62; 70/248, 70/250, 271
See application file for complete search history.

(56) References Cited

U.S. PATENT DOCUMENTS

| | | | |
|---|---|---|---|
| 3,937,105 A | 2/1976 | Arai et al. | |
| 4,051,915 A | 10/1977 | Behrens | |
| 4,892,014 A | 1/1990 | Morell et al. | |
| 5,696,679 A | 12/1997 | Marshall et al. | |
| 5,919,112 A | 7/1999 | Michael et al. | |
| 2007/0135261 A1 | 6/2007 | Berger et al. | |
| 2008/0040009 A1 | 2/2008 | Kamada et al. | |
| 2009/0111647 A1 | 4/2009 | Hecht et al. | |
| 2009/0111648 A1 | 4/2009 | Hecht et al. | |
| 2009/0111649 A1 | 4/2009 | Hecht et al. | |
| 2009/0111654 A1 | 4/2009 | Hecht et al. | |
| 2009/0176619 A1 | 7/2009 | Inoue | |
| 2009/0217782 A1 | 9/2009 | Wang | |
| 2010/0206118 A1 | 8/2010 | Nagashima et al. | |

FOREIGN PATENT DOCUMENTS

| | | |
|---|---|---|
| DE | 41 27 991 A1 | 2/1993 |
| DE | 199 29 360 A1 | 12/2000 |
| DE | 100 37 576 A1 | 2/2002 |
| DE | 103 20 280 A1 | 11/2003 |
| EP | 0 814 287 A1 | 12/1997 |

*Primary Examiner* — Roger Pang
(74) *Attorney, Agent, or Firm* — Davis & Bujold, P.L.L.C.

(57) ABSTRACT

A method of automatically engaging a parking lock or an automatic or automated gearbox of a motor vehicle, which can be engaged depending on a drive position selected by the driver of the motor vehicle, by way of a selector device and depending on other operating parameters. In order to achieve as little restriction of the drivability of the motor vehicle as possible, without neglecting the safety of the driver and surroundings, two different complex embodiments of an Auto_P function for automatically engaging the parking lock are proposed, if the motor vehicle is at least approximately stopped and, at the same time, an ignition circuit acting on the drive motor of the motor vehicle is electrically interrupted.

12 Claims, 6 Drawing Sheets

METHOD FOR AUTOMATICALLY ENGAGING A PARKING LOCK OF AN AUTOMATIC OR AUTOMATED GEARBOX OF A MOTOR VEHICLE

This application is a divisional of U.S. Ser. No. 12/186,713 filed on Aug. 6, 2008 which claims priority from German Application Serial No. 10 2007 042 210.7 filed Sep. 5, 2007.

FIELD OF THE INVENTION

The invention relates to a method for automatically engaging a parking lock of an automatic or automated gearbox of a motor vehicle, which can be engaged depending on a drive position selected by the driver using a selector device, and depending on other operating parameters of the motor vehicle.

BACKGROUND OF THE INVENTION

Known automatic or automated motor vehicle gearboxes normally feature a parking lock which can mechanically fix an output shaft of the gearbox. In addition to a purely mechanical system for actuating this kind of parking lock by way of a mechanical functional connection between a selector lever operable by the driver in the interior of the motor vehicle and the parking lock in the gearbox, electromechanical and electrohydraulic systems are also known for actuating this type of parking lock—for example from DE 41 27 991 C2—in which the parking lock in the gearbox is connected, via an electric functional connection, with a selector device operable by the driver in the interior of the motor vehicle, and in which the parking lock can be electromechanically or electrohydraulically actuated by way of a parking-brake function implemented in an electronic control device of the gearbox, depending on a drive position selected on the selector device and depending on other operating parameters of the motor vehicle.

In addition, there are various known methods of automatically engaging this kind of parking lock, U.S. Pat. No. 3,937,105 proposes automatically engaging the parking lock of the gearbox independently of the driving position selected by the driver if an ignition circuit of the motor vehicle is interrupted and the motor vehicle is still rolling at a speed that is lower than a defined low threshold value.

A method is known from U.S. Pat. No. 4,892,014 in which the parking lock of the gearbox is automatically engaged by way of an electric motor when an ignition circuit of the motor vehicle is uninterrupted and, at the same time, the vehicle speed is lower than a defined low threshold value, and when the driver door of the motor vehicle is open and, simultaneously, the driver seat of the motor vehicle is unoccupied and the vehicle speed is lower than the cited low threshold value. In both cases, it is provided that when the parking lock is automatically engaged, a parking brake of the motor vehicle is actuated as well. In U.S. Pat. No. 4,892,014, it is also proposed that when the ignition circuit is closed when the drive motor of the motor vehicle is not running, the gearbox automatically switches to its neutral position without a driver request being necessary.

And finally, from EP 0 814 287 B1, a function for automatically engaging the parking lock of an automatic gearbox is known, with which the parking lock in the automatic gearbox is automatically engaged by the gearbox control device when the speed of the motor vehicle is zero and, at the same time, an ignition circuit is interrupted and, while simultaneously, as an additional condition, either a predetermined time interval has passed since the interruption of the ignition circuit, or a vehicle door is opened, but no later—and then as the only condition—than when the ignition key has been removed from the ignition switch. In order to achieve better vehicle availability, it is a special feature in all three cases that the engagement of the parking lock is prevented when the driver, immediately before switching off the motor or within a predetermined time interval after switching off the motor, has selected the neutral drive position with the selector lever.

The object of the present invention is to devise an operator for automatically engaging the parking lock of an automatic or automated gearbox that is an alternative to the state of the art, and which sufficiently protects the vehicle against start-up or rolling that is not intended by the driver and has the least possible impairment of vehicle drivability or movability, while avoiding a change in the operating state of the gearbox or the vehicle that is unexpected by the driver.

SUMMARY OF THE INVENTION

Proposed are two different variations of an Auto P-function for automatically engaging a parking lock of an automatic or automated gearbox of a motor vehicle when the motor vehicle is almost at a stop and, at the same time, an ignition circuit acting on the drive motor of the motor vehicle is electrically interrupted.

Both of the proposed variations, according to the invention, are based on a method according to which the parking lock of the automatic or automated motor vehicle gearbox can be automatically engaged depending on a drive position selected by the driver by way of a selector device and depending on other driving parameters of the motor vehicle.

Essential to the invention in all five proposed embodiments is the functional connection of particular individual aspects or individual characteristics. In order to provide a clear presentation of these functional connections that avoids confusion, known Boolean logical operators will be used below.

As one essential difference from the state of the art, in all five proposed embodiments, the evaluation and use of a signal that represents or is supposed to represent the state in which the "ignition key has been removed from the ignition switch" will be deliberately dispensed with. In this way, the methods according to the invention are particularly suitable for motor vehicles with a "keyless ignition system" in which, instead of the "classical" mechanical ignition key, an electronic ignition key is provided, which consists of a mobile transmitter and a receiver that is affixed to the vehicle. Electronic ignition keys are known from experience, where the transmitter of the electronic ignition key is used only for unlocking and locking the vehicle doors and for starting the drive motor of the vehicle, but which have no influence on the interruption of the ignition circuit of the drive motor and thus on turning off the motor. Experience has also demonstrated that the actual distance between transmitter and receiver of the electric ignition key cannot always be determined with an accuracy that reliably identifies the driver's wish to leave the vehicle.

In a first embodiment, it is provided in accordance with the invention, that IF a detected current speed of the motor vehicle is lower than a predefined low threshold value, AND simultaneously an ignition circuit of the motor vehicle acting on the drive motor of the motor vehicle is electronically interrupted, AND a drive position of "Neutral" (N) is selected using the selector device, the drive position "Neutral" (N) remaining engaged in the gearbox or automatically engaged, AND simultaneously that IF the current speed of the vehicle is smaller than the predefined small threshold value, AND simultaneously the ignition circuit is electrically interrupted, AND a drive position "Drive" (D) or "Reverse" (R) is selected, the parking lock of the gearbox is automatically engaged, AND that IF the current speed of the vehicle is smaller than the predefined small threshold valve, AND simultaneously the ignition circuit is electrically interrupted, AND a drive position "Park" (P) is selected using the selector device, the parking lock of the gearbox is engaged or remains engaged.

In accordance with the invention, therefore, the three individual functions, each with its own functional logic, are here combined using Boolean AND operators, into a complex overall function.

The first individual function ("IF a detected current speed of the motor vehicle is smaller than a predefined low threshold value AND at the same time an ignition circuit of the vehicle acting on a drive motor of the vehicle is electrically interrupted, AND a drive position of "Neutral" is selected using the selector device, THEN—if this has not already happened—the drive position of "Neutral" is automatically engaged in the gearbox) takes into account the operating states in which the driver himself, before or during detection that the motor vehicle, with an interrupted ignition circuit, is stopped or has at least almost stopped, selects the neutral position using the selector device of the motor vehicle. In order to realize the greatest possible drivability of the motor vehicle—for example in order to use a vehicle washing facility—automatic engagement of the parking lock of the gearbox is dispensed with. There is a sufficiently high safety level for the vehicle occupants and surroundings because the driver himself has deliberately put the gearbox into the neutral position and therefore ensured that the drive train of the motor vehicle is not engaged. The driver can at any time actively engage the parking lock by switching the selector device from "Neutral" to "Park." By way of an ignition-switch lock—also known as a "key lock"—which is optionally activated parallel to the selected drive position N or, in general, parallel to a selected drive position "NON P"—it can be ensured that the mechanical ignition key cannot be unintentionally withdrawn from its mechanical or electromechanical ignition switch or that with a keyless ignition switch system an electronic ignition key—also known as an "ID card"—cannot be unintentionally taken too far from its electronic ignition switch. In active state, known mechanical ignition-switch locks, for example by way of an electromagnetically activated locking element, prevent the ignition key from being removed from the ignition switch if the selector device of the motor vehicle is not in the drive position "Park" (P).

The second individual function ("IF the current speed of the motor vehicle is lower than the predefined threshold value AND at the same time, the ignition circuit is electrically interrupted, AND a drive position "Drive" or "Reverse" is selected, THEN the parking lock of the gearbox is automatically engaged") takes into account the driving states in which the selector device, before or during detection that the motor vehicle, with an interrupted ignition circuit, is stopped or has almost stopped, is in a position which results in power being transmitted to the gearbox due to the drive motor running or because there is a sufficient supply of pressure medium to the gearbox. In this case, for safety reasons, the parking lock of the gearbox is automatically engaged to prevent the motor vehicle from rolling.

The third individual function ("IF the current speed of the motor vehicle is lower than the predefined low threshold value, AND at the same time the ignition circuit is electrically interrupted, AND the drive position "Park" is selected using the selector device, THEN—if it has not already taken place—the parking lock of the gearbox is engaged") takes into account the operating states in which the driver, before or during detection that the motor vehicle, with an interrupted ignition circuit, is stopped or has almost stopped, has himself selected the park position using the selector device of the motor vehicle. This unequivocal wish is implemented in the gearbox by way of the third individual function, which transfers the gearbox as desired into the park position with the output locked.

As a result, through the combination of these three individual functions by way of the logical AND achieves a high vehicle availability with a simultaneous high degree of safety for the vehicle occupants and their surroundings against unwanted rolling of the vehicle.

Advantageously, dispensing with the evaluation and use of a signal that represents the state in which the "ignition key is out of or removed from the ignition switch" in connection with the method according to the first approach according to the invention makes it possible for the driver to remove the mechanical ignition key from the mechanical ignition lock or the electronic ignition key a sufficient distance from the electronic ignition switch, in order to securely prevent accidental or improper starting of the drive motor, without having to leave the desired unengaged neutral position of the gearbox.

BRIEF DESCRIPTION OF THE DRAWINGS

The invention will now be described, by way of example, with reference to the accompanying drawings in which.

DETAILED DESCRIPTION OF THE INVENTION

Figure 1:
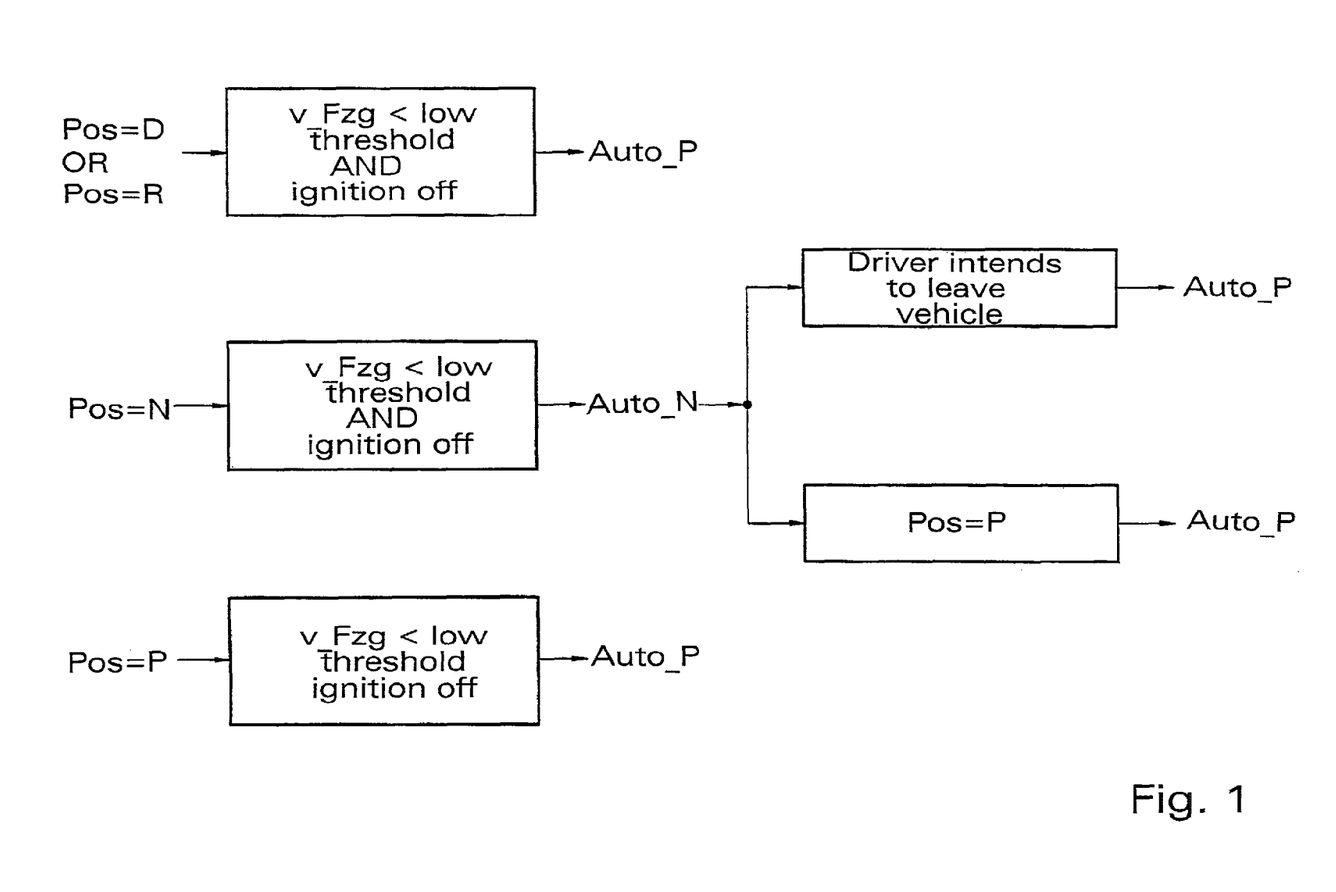
FIG. 1 shows an operation sequence diagram.
Figure 1A:
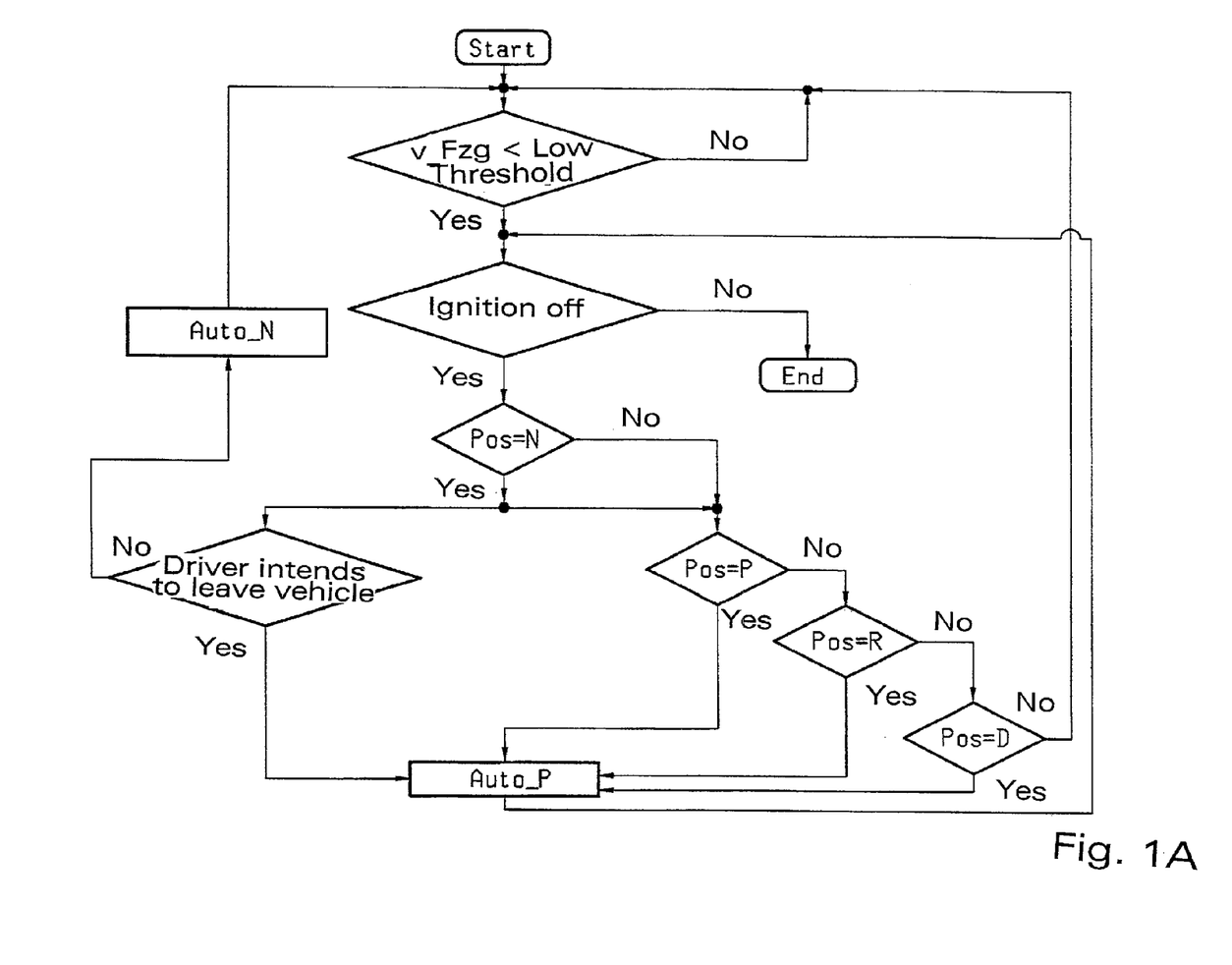
FIG. 1A shows another operation sequence diagram.
Figure 1B:
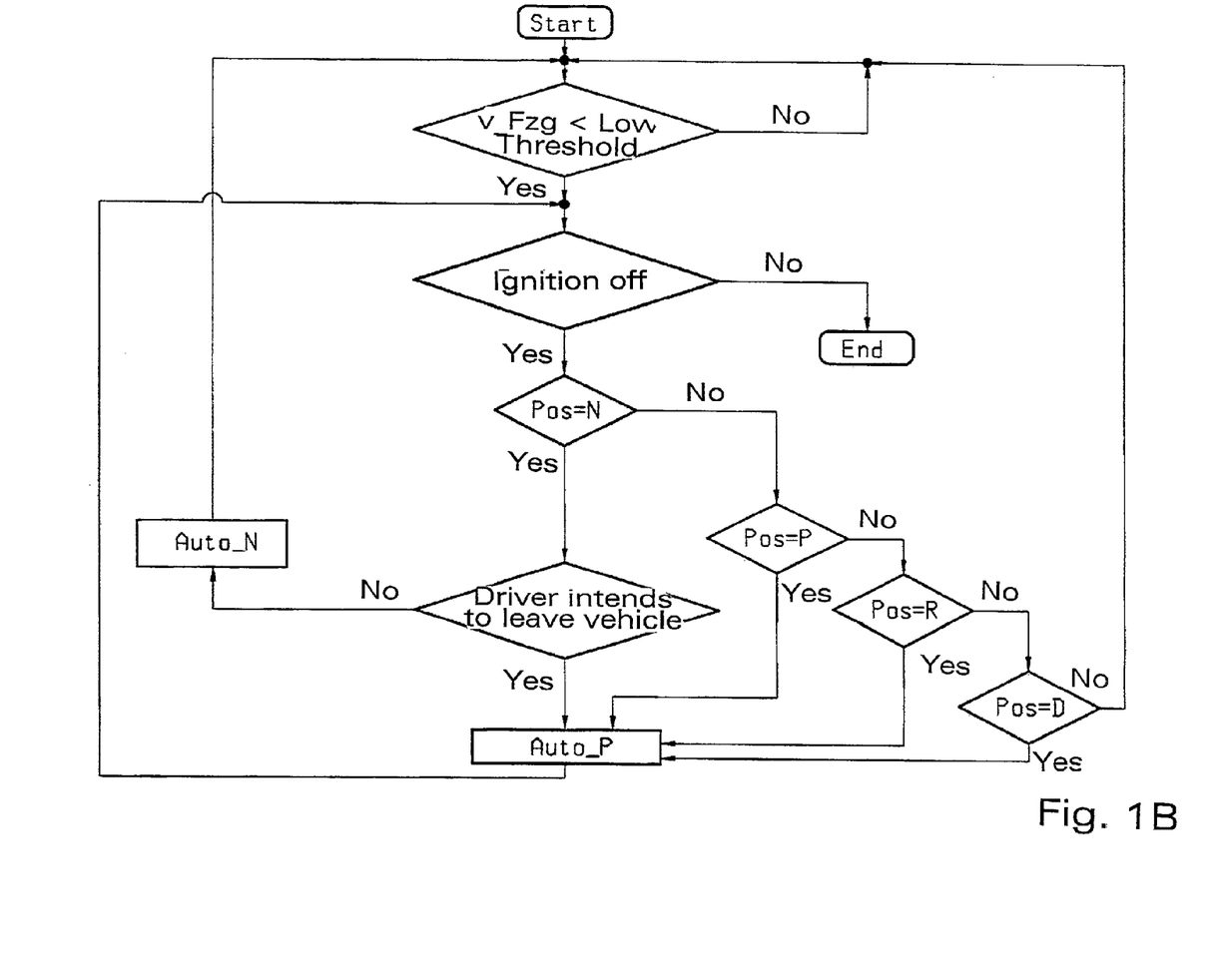
FIG. 1B shows a further operation sequence diagram.

For further explanation, operation sequence diagrams are shown in FIGS. 1, 1A and 1B, as respective examples of the technical implementation of a method according to the first approach according to the invention detailed above. As their graphic representation is clearly understandable as such for the person skilled in the art, comprehensive explanation of the Figures can be dispensed with at this point in order to avoid repetition. The reference symbols used and their meanings are listed in the list of reference symbols.

Figure 2:
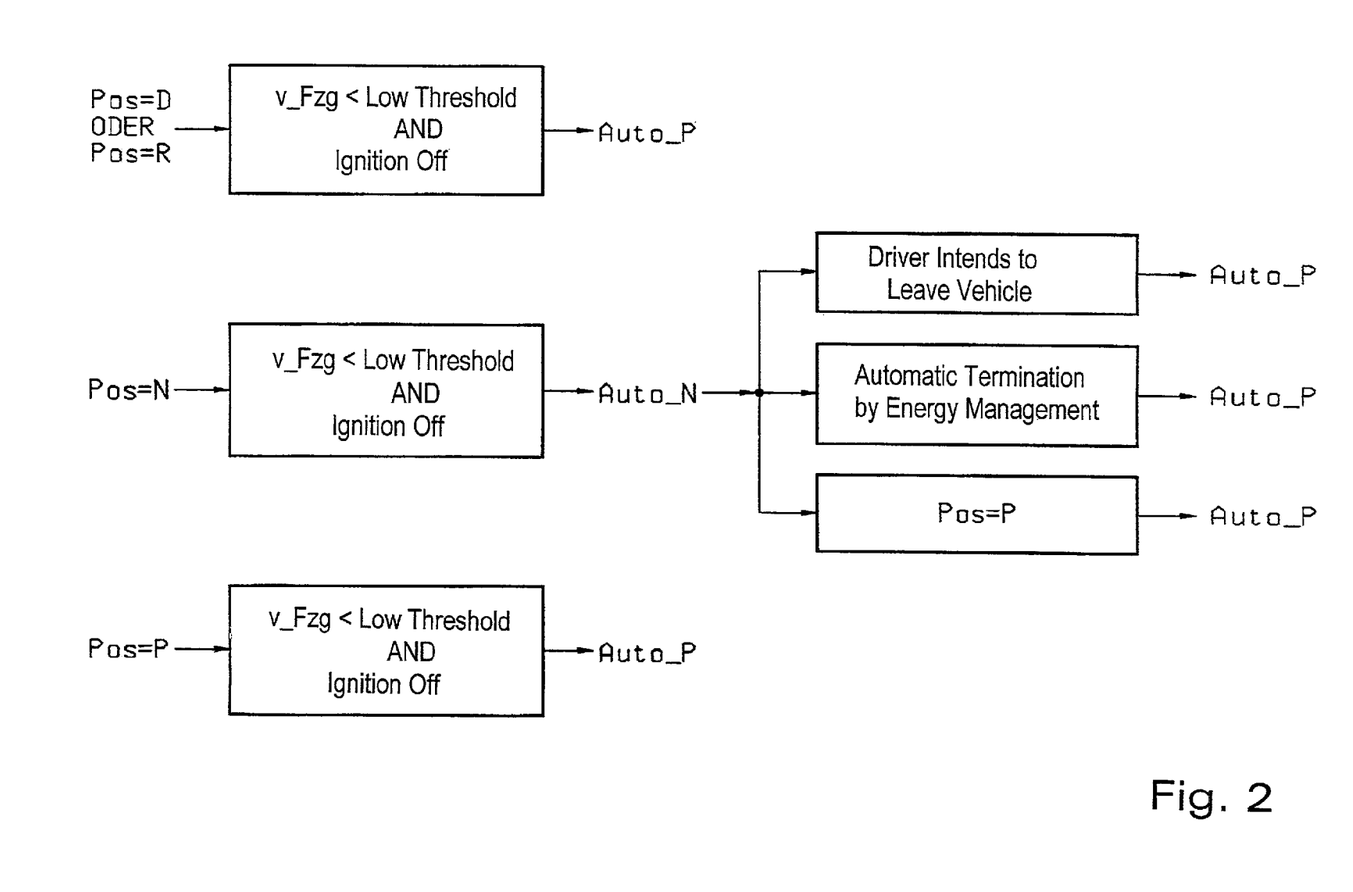
FIG. 2 shows an operation sequence diagram of an advantageous further development according to the first approach as shown in FIG. 1 with energy management also provided.

FIG. 2 shows an operation sequence diagram of an advantageous further development of this method, according to the previously described first approach of the invention as shown in FIG. 1. The only difference from the operation sequence diagram shown in FIG. 1 is that energy management is also provided, that can automatically terminate the phase in which the gearbox is in a non-engaged neutral position. This is based on the recognition that usual electrohydraulically controlled automatic gearboxes with an automatically engageabie parking lock are structurally designed for safety reasons in such a way that the parking lock is automatically engaged by spring force when the electrohydraulic gearbox control is shifted without power, and that the parking lock can be kept electromagnetically in a released state when the electrohydraulic gearbox control is without pressure. This electricity consumption by the electromagnet, in turn, burdens the vehicle power system. In that respect, it can be expedient to monitor whether the gearbox is being kept too long in a neutral position with the drive motor running. Various possibilities for this will be discussed in detail later in connection with the invention.

In a second approach to the task, IF a detected current speed of the motor vehicle is lower than a predefined low threshold value, AND at the same time an ignition circuit of the vehicle acting on the drive motor of the motor vehicle is electrically interrupted, AND the drive position "Neutral" (N) is selected by way of the selector device, AND it is simultaneously detected that the driver does not intend to leave the vehicle, the drive position "Neutral" (N) remains engaged in the gearbox or is engaged, AND that IF the current speed of the vehicle is lower than the predefined low threshold value, AND the ignition circuit is electrically interrupted, AND the drive position "Neutral" (N) is selected by way of the selector device, AND it is detected at the same time that the driver intends to leave the vehicle or is leaving it, the drive position "Neutral" (N) remains engaged in the gearbox or is engaged, AND a warning signal is automatically sent to the driver, AND that IF the current speed of the motor vehicle is lower than the predefined low threshold value, AND at the same time the ignition circuit is electrically interrupted, AND using the selector device, a drive position "Drive" (D) or "Reverse" (R) is selected, AND at the same time it is detected that the driver does not intend to leave the motor vehicle, the drive position "Neutral" (N) is automatically engaged in the gearbox, AND that IF the current speed of the motor vehicle is lower than the predefined low threshold value, AND at the same time the ignition circuit is electronically interrupted, AND using the selector device, a drive position "Drive" (D) or "Reverse" (R) is selected, AND at the same time it is detected at the same time that the driver of the motor vehicle intends to leave the vehicle or is leaving it, the parking lock of the gearbox is automatically engaged, AND that IF the current speed of the motor vehicle is lower than the predefined low threshold device, AND at the same time the ignition circuit of the motor vehicle is electrically interrupted, AND a drive position "Park" (P) is selected using the selector device, the parking lock of the gearbox is engaged or remains engaged.

Five individual functions, each with its own functional logic, are therefore combined, according to the invention, by way of Boolean AND-operators into a complex overall function.

The first individual function ("IF a detected current speed of the motor vehicle is lower than a predefined low threshold value, AND at the same time an ignition circuit of the vehicle acting on the drive motor of the motor vehicle is electrically interrupted, AND a drive position "Neutral" is selected using the selector device, AND at the same time it is detected that the driver does not intend to leave the vehicle, THEN—if this has not already happened—the drive position "Neutral" is engaged") takes into account the operating states in which the driver before or during detection that the motor vehicle, with the ignition circuit interrupted, is stopped or has at least almost stopped, has himself selected the neutral position using the selector device of the motor vehicle. In order to realize the greatest possible drivability of the motor vehicle—for example, in order to use a car washing facility—automatic engagement of the parking lock is dispensed with. There is a high degree of safety for the vehicle occupants and the surroundings, because the driver has himself deliberately selected the neutral position of the gearbox, and thus the non-engagement of the drivetrain of the motor vehicle, and because there is also monitoring of whether the driver of the motor intends to leave the motor vehicle or is currently leaving it. The driver himself can actively engage the parking lock of the gearbox at any time by switching the selector device from "Neutral" to "Park." By way of an optional ignition-switch block that is additionally actuated parallel to the selected drive position N, or generally parallel to a selected drive position "NON P"—also known as a so-called "key lock"—it can be ensured that the mechanical ignition key is not unintentionally removed from its (mechanical or electro-mechanical) ignition switch or, in the case of a keyless ignition-switch system, that an electronic ignition key—also known as an "ID card"—is not unintentionally taken too far away from its (electronic) ignition switch. With known mechanical ignition-switch blocks, an electromagnetically activated locking element when in an activated state prevents removal of the ignition key from the ignition switch when the selector device of the motor vehicle is not in the drive position "Park" (P).

However, if it is detected that the driver intends to leave the vehicle while the motor vehicle, with an uninterrupted ignition circuit, is at least nearly at a standstill, and the gearbox, as the driver wishes, is in a neutral position, the second individual function ("IF the current speed of the motor vehicle is lower than the predefined threshold value, AND at the same time the ignition circuit is electrically interrupted, AND the drive position "neutral" is selected using the selector device, and it is detected that the driver intends to leave the vehicle or is in the process of leaving it, THEN—if it has not already happened—the drive position "Neutral" is engaged in the gearbox") becomes active: the gearbox remains in the neutral position desired by the driver, however, in addition the relevant warning is now automatically sent to the driver, which alerts the driver of the possibility of the vehicle rolling. In order to prevent possible unwanted rolling of the vehicle, the driver himself can, at any time, actively engage the parking lock of the gearbox by switching the selector device from "Neutral" to "Park."

The third individual function ("IF the current speed of the motor vehicle is lower than the predefined low threshold value, AND at the same time the ignition circuit is electrically interrupted, AND the drive position "Drive" or "Reverse" is selected using the selector device, AND it is detected at the same time that the driver does not intend to leave the vehicle, THEN the drive position "Neutral" is automatically engaged in the gearbox") takes into account the operating states in which the selector device, before or during detection that the motor vehicle, with an interrupted ignition circuit, is stopped or has almost stopped, is in a position which results in power being transmitted to the gearbox due to the drive motor running or because there is a sufficient supply of pressure medium to the gearbox. The (additional) monitoring involved in the third individual function of whether the driver intends to leave the vehicle or is in the process of leaving it permits another increase in vehicle availability: if it is reliably detected that the driver does not intend to leave the vehicle, automatic engagement of the parking lock is dispensed with and the gearbox is put into its non-engaged neutral position. As with the first and second individual functions, optionally an additional actuation of the ignition-block can be provided in order to protect against unintentional withdrawal or removal of the ignition key from the ignition switch.

The fourth individual function ("IF the current speed of the motor vehicle is lower than the predefined low threshold value, AND at the same time the ignition circuit is electrically interrupted, AND a drive position "Drive" or "Reverse" is selected using the selector device, AND it is detected at the same time that the driver intends to leave the motor vehicle or is in the process of doing so, THEN the parking lock of the gearbox is automatically engaged") like the third individual function takes into account the operating states in which the selector device, before or during detection that the motor vehicle, with an interrupted ignition circuit, is stopped or has nearly stopped moving, is in a position which results in power being transmitted to the gearbox due to the drive motor running, or because there is a sufficient supply of pressure medium to the gearbox. In contrast to the third individual function, if it is also detected that the driver intends to leave the vehicle or is in the process of doing so, the parking lock of the gearbox is automatically engaged for safety reasons, in order to prevent the motor vehicle, in any case, from rolling away if the driver is no longer in the motor vehicle.

The fifth individual function ("IF the current speed of the motor vehicle is lower than the predefined low threshold value, AND at the same time the ignition circuit of the motor vehicle is electrically interrupted, AND a drive position "Park" is selected using the selector device, THEN—if this has not already happened—the parking lock of the gearbox is engaged") takes into account the operating states in which the driver, before or after detection that the motor vehicle, with an interrupted ignition circuit, is stopped or has almost stopped, has himself selected the park position using the selector device. This unequivocal wish on the part of the driver is implemented in the gearbox by way of this fifth individual function.

As a result, the combination of these five individual functions, by way of logical AND, results in a particularly high vehicle availability with, at the same time, sufficient appreciation of the obligatory safety aspects relating to the vehicle occupants and their surroundings.

Advantageously, dispensing with the evaluation and use of a signal that represents a state in which the "ignition key is out or removed from the ignition switch," also in connection with the method according to the second approach according to the invention, makes it possible for the driver to remove the mechanical ignition key from the mechanical ignition switch or to take the electronic ignition key a sufficient distance from the electronic ignition switch to securely avoid unintentional or improper starting of the drive motor, without having to leave the desired non-engaged neutral position of the gearbox.

Figure 3:
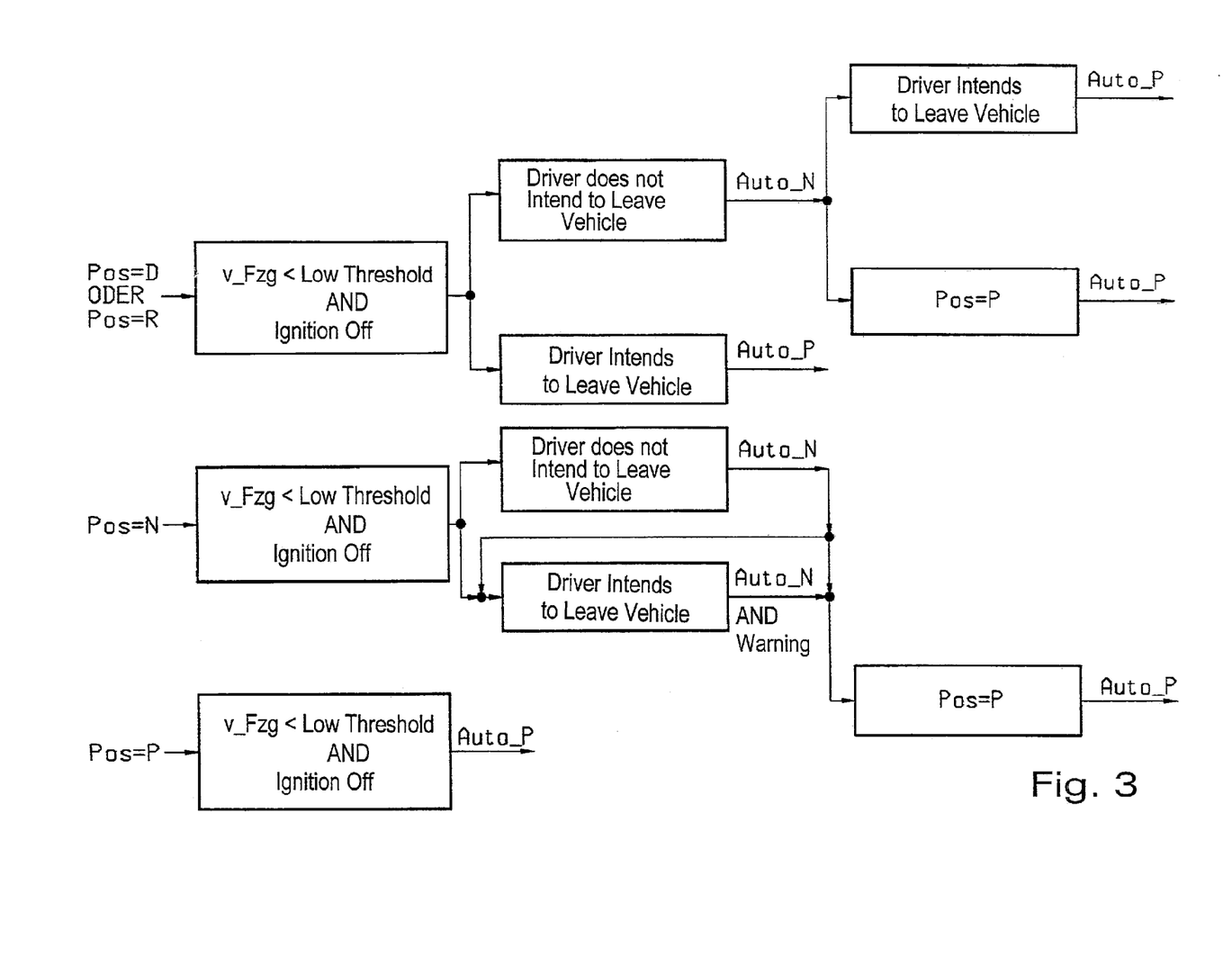
FIG. 3 shows an operation sequence diagram of an advantageous further development.

As a further explanation, an operation sequence diagram is shown in FIG. 3 as an example of the technical implementation of a method according to the second approach, according to the invention as detailed above. Because this graphic depiction is as such clearly understandable to the person skilled in the art, a comprehensive explanation of this Figure can be dispensed with at this point in order to avoid repetition. The reference symbols used and their meanings are given in the list of reference symbols.

Figure 4:
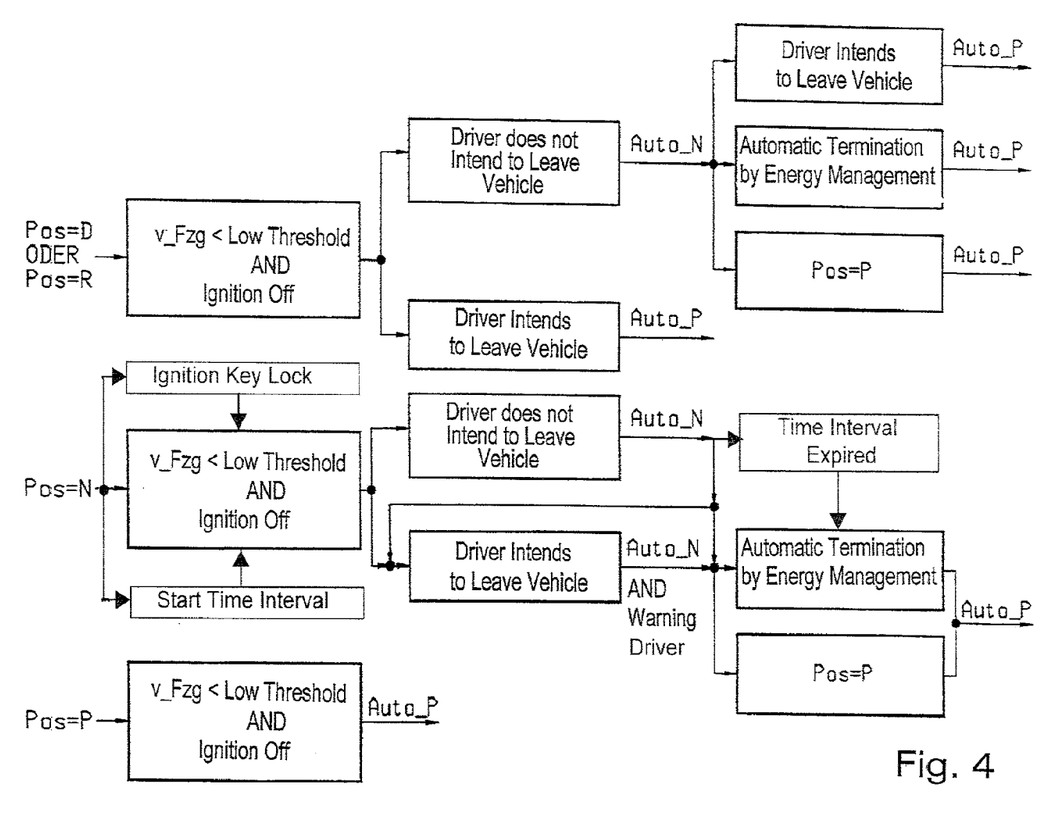
FIG. 4 shows an operation sequence diagram of an advantageous further development of the method shown in FIG. 3 with an operation sequence diagram that energy management is additional provided.

FIG. 4 shows an operation sequence diagram of an advantageous further development of the method shown in FIG. 3, according to the previously described second approach according to the invention. The only difference from the operation sequence diagram, shown in FIG. 3, is that energy management is additionally provided, by way of which the phase in which the gearbox is in a non-engaged neutral position can be automatically terminated. Various possibilities for monitoring whether the gearbox is being kept too long in the neutral position with the drive motor off will be discussed later in detail with reference to the invention.

Additional embodiments and further developments of the invention will be described in more detail below.

It can thus be provided in an embodiment of the second approach according to the invention that the warning is issued acoustically and/or optically when it is detected that the driver intends to leave the vehicle or is in the process of doing so.

In additional embodiments of the second approach according to the invention, several methods are proposed for detecting that the driver intends to leave the vehicle or is in the process of doing so.

It can be provided, for example, that IF the driver door of the vehicle is open AND the driver seatbelt is unbuckled, it is detected that the driver intends to leave the vehicle or is in the process of doing so.

Alternatively, it can be provided that IF a driver door of the motor vehicle is open AND a driver seat occupancy detector reports an unoccupied driver seat, it is detected that the driver of the motor vehicle intends to leave or is in the process of leaving the motor vehicle.

In another alternative, it can be provided that IF a driver seat belt is unbuckled AND a driver seat occupancy detector reports an unoccupied seat, it is detected that the driver intends to leave the motor vehicle or is in the process of doing so.

In a further alternative, it can also be provided that IF a driver door of the motor vehicle is open, AND a driver seatbelt is not fastened, AND a driver seat occupancy detector reports an unoccupied driver seat, it is detected that the driver intends to leave the vehicle or is in the process of doing so.

The following three additional developments of the invention concern protection of the vehicle electrical supply and can be combined both with the previously described method according to the first approach of the invention and the previously described method according to the second approach of the invention. Based on the consideration that under unfavorable circumstances, it might be expedient to prematurely terminate the condition of a neutral position of the gearbox, it is proposed in the case of a first additional development that the neutral position of the gearbox, which was previously actuated at the driver's wish, be automatically terminated independently of the drive position "N" selected by way of the selector device, and the parking lock be automatically engaged when a predefined time interval has expired. In this case, the cited time interval starts in an expedient manner, when the position "N" is detected in the selector device or no later than when the gearbox is actually in the neutral position. This comparatively simple functional expansion of the method, according to the invention, prevents the vehicle battery from excessive discharge due to the electrical load of the gearbox control device.

Even more efficient protection of the vehicle battery against excessive discharge is provided by the second additional development of the invention, in which it is proposed that the present electric charge condition and/or the current electrical voltage of the vehicle battery be monitored. If the charge condition or the electrical voltage of the vehicle battery drops to a value below a predefined discharge threshold, the previously actuated neutral position of the gearbox is automatically terminated, and the parking lock of the gearbox is engaged independently of the drive position selected by way of the selector device. This monitoring of charge condition and/or voltage is, of course, not limited to monitoring of the vehicle battery, but extends to all electrical sources provided to supply the control device that controls the parking lock in particular when this energy source also provides or must provide the electrical power required for restarting the drive motor of the vehicle.

The most efficient protection of the vehicle battery against excessive discharge is offered by the third additional development of the invention, which provides for monitoring of the energy drawn, during the function according to the invention of the vehicle battery or of the electrical power source of the motor vehicle that is provided to supply the gearbox control device and/or to start the drive motor in particular the power used by the gearbox control unit. This kind of energy quantity can be computed relatively simply by integrating the current power consumption of the gearbox control device over time or by integrating the mathematical product of the actual current operating voltage and actual current power consumption of the gearbox device over time. Accordingly, in the additional development of the invention proposed here, the previously actuated neutral position of the gearbox is automatically terminated, and independently of the drive position selected by way of the selector device, the parking lock of the gearbox is automatically engaged when the energy quantity used in the function of the vehicle battery according to the invention or that drawn from the electrical power provided to supply the gearbox control device and/or for starting the drive motor exceeds a predefined threshold value.

In principle, all of the previously cited methods, according to the invention, are suitable for automatically engaging a parking lock of any design. Usually the parking lock of an automatic or automated switching gearbox is integrated into the gearbox itself. Usually the actuation system for the parking lock, which in known gearboxes functions mechanically, hydraulically, pneumatically, electrically, hydromechanically, pneumomechanically, electromechanically, electrohydraulically, or electropneumatically, is integrated into the gearbox or arranged immediately outside on the gearbox. In the case of an electromechanically, electrohydraulically or electropneumatically functioning actuation system of the parking lock, the actuator acting on the parking lock is normally controlled by a gearbox control device. That being the case, it is reasonable that the automatic engagement of the parking lock also be initiated by the gearbox control device according to one of the described methods according to the invention. However, in principle the control command that leads to the engagement of the parking lock of the gearbox could also be sent by any other electronic control device of the motor vehicle to the gearbox from a control device of the selector device accessible to the driver.

REFERENCE NUMERALS

V_Fzg vehicle speed
Pos a drive position selected using a selector device
P the drive position "Park"
N the drive position "Neutral"
R the drive position "Reverse"
D the drive position "Drive"
Auto_N functional step "Engaging and leaving the gearbox in the neutral position"
Auto_P functional step "Engaging the parking lock and leaving the parking lock in the engaged state"

The invention claimed is:

1. A method for automatically engaging a parking lock of one of an automatic or an automated gearbox of a motor vehicle that can be engaged depending on a drive position (P, R, N, D) selected by a driver of the motor vehicle by way of a selector device, and depending on other operating parameters of the motor vehicle, the method comprising the steps of:
one of retaining engagement of or automatically engaging a drive position of "Neutral" (N) in the gearbox, IF a detected current speed (v_Fzg) of the motor vehicle is lower than a predefined low threshold value, AND simultaneously an ignition circuit of the motor vehicle that acts on a drive motor of the motor vehicle is electrically interrupted, AND a drive position of "Neutral" (N) is selected using the selector device, AND it is detected that the driver of the motor vehicle does not intend to leave the vehicle;
AND one of retaining engagement of or automatically engaging the drive position of "Neutral" (N) in the gearbox, AND automatically sending a warning to the driver, IF the current speed (v_Fzg) of the motor vehicle is lower than the predefined low threshold value, AND simultaneously the ignition circuit is electrically interrupted, AND the drive position "Neutral" (N) is selected by way of the selector device, AND it is detected that the driver one of intends to leave the motor vehicle or is in the process of leaving it;
AND automatically engaging the drive position of "Neutral" (N) in the gearbox, IF the current speed (v_Fzg) of the motor vehicle is lower than the predefined low threshold value, AND simultaneously the ignition circuit is electrically interrupted, AND one of a drive position of "Drive" (D) or "Reverse" (R) is selected by way of the selector device, AND it is detected that the driver does not intend to leave the motor vehicle;
AND automatically engaging a parking lock of the gearbox, IF the current speed (v_Fzg) of the motor vehicle is lower than the predefined low threshold value, AND simultaneously the ignition circuit is electrically interrupted, AND one of the drive position of "Drive" (D) or "Reverse" (R) is selected, AND it is detected that the driver one of intends to leave the motor vehicle or is in the process of leaving it;
AND one of retaining engagement of or automatically engaging the parking lock of the gearbox, IF the current speed (v_Fzg) of the motor vehicle is lower than the predefined low threshold value, AND simultaneously the ignition circuit is electrically interrupted, AND a drive position "Park" (P) is selected by way of the selector device.

2. The method according to claim 1, further comprising the step of activating an ignition-switch lock, which in an activated state prevents one of a mechanical ignition key from being withdrawn from one of a mechanical or electromechanical ignition switch, or an electronic ignition key from being removed a sufficient distance from an electronic ignition switch, IF the drive position (P, R, N, D) selected by way of the selector device is not the drive position of "Park" (P).

3. The method according to claim 1, further comprising the step of issuing the warning by at least one of acoustically and optically.

4. The method according to claim 1, further comprising the step of detecting that the driver one of intends to leave the motor vehicle or is engaged in leaving the vehicle, IF at least one of,
a driver door of the motor vehicle is open,
a driver seatbelt is not fastened, and
a driver seat occupancy detector reports an unoccupied driver seat.

5. The method according to claim 1, further comprising the step of automatically terminating the drive position of neutral of the gearbox, independent of the drive position of "Neutral" (N) which was previously selected by the driver by way of the selector device and automatically engaging the parking lock, when a predefined time interval has expired.

6. The method according to claim 5, further comprising the step of commencing the predefined time interval when the drive position of "Neutral" (N) is one of detected by the selector device, or no later than when the gearbox is in the drive position of neutral.

7. The method according to claim 1, further comprising the step of automatically terminating a previously activated neutral position of the gearbox, independent of the drive position "Neutral" (N) selected by way of the selector device, and automatically engaging the parking lock, if a current charge condition of an electric energy source, which is provided to at least one of supply a control device actuating the parking lock and start the drive motor, drops to a value below a predefined discharge threshold.

8. The method according to claim 1, further comprising the step of automatically terminating a previously activated neutral position of the gearbox, independent of the drive position "Neutral" (N) selected by way of the selector device, if an actual electrical voltage of the electric power source, which is provided for one of actuating a parking lock control device and starting the drive motor, drops to a value below a predefined discharge threshold.

9. The method according to claim 1, further comprising the step of a automatically terminating a previously activated neutral position of the gearbox, independent of the drive position "Neutral" (N) selected by way of the selector device, and automatically engaging the parking lock when a quantity of energy drawn from an energy source for the motor vehicle, that is intended for at least one of supplying the control device of the gearbox and starting the drive motor, one of reaches or exceeds a predefined threshold value.

10. The method according to claim 9, further comprising the step of detecting the quantity of energy drawn from the energy source by one of mathematical integration of a current power consumption of the control device over time, or mathematical integration of the product of a current operating voltage and a current power consumption of the control device over time.

11. The method according to claim 1, further comprising the step of initiating engagement of the parking lock by a control device of the gearbox.

12. The method according to claim 1, further comprising the step of initiating engagement of the parking lock by a control device of the selector device of the motor vehicle.

* * * * *